(12) United States Patent
Leimbach et al.

(10) Patent No.: US 11,537,714 B2
(45) Date of Patent: Dec. 27, 2022

(54) FACILITATING ANTIVIRUS SCAN FILING LOCKING BASED ON CLUSTER LOCK MECHANISM IN DISTRIBUTED FILE SYSTEMS

(71) Applicant: EMC IP Holding Company LLC, Hopkinton, MA (US)

(72) Inventors: David Leimbach, Lynnwood, WA (US); Douglas Kilpatrick, Seattle, WA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 17 days.

(21) Appl. No.: 17/075,396

(22) Filed: Oct. 20, 2020

(65) Prior Publication Data
US 2022/0121743 A1    Apr. 21, 2022

(51) Int. Cl.
G06F 21/56       (2013.01)
G06F 16/176      (2019.01)

(52) U.S. Cl.
CPC ........ *G06F 21/565* (2013.01); *G06F 16/1774* (2019.01); *G06F 21/561* (2013.01); *G06F 2221/034* (2013.01)

(58) Field of Classification Search
CPC ..... H04L 63/20; H04L 63/10; H04L 63/1416; H04L 63/105; H04L 63/145; H04L 63/0263; H04L 65/4084; H04L 2209/60; G06F 16/176; G06F 16/1774; G06F 16/17; G06F 16/152; G06F 21/577; G06F 21/56; G06F 21/561; G06F 21/565; G06F 21/566; G06F 21/562; G06F 21/554; G06F 21/51; G06F 21/60; G06F 21/54; G06F 21/6218; G06F 2221/034; G06F 2221/2141; G06F 2201/86; H04W 12/128
See application file for complete search history.

(56) References Cited

U.S. PATENT DOCUMENTS

| | | | | |
|---|---|---|---|---|
| 5,553,239 | A | * | 9/1996 | Heath ..................... G06F 9/505 705/77 |
| 2014/0059687 | A1 | * | 2/2014 | Coronado ............. G06F 21/562 726/24 |

* cited by examiner

*Primary Examiner* — Brian F Shaw
(74) *Attorney, Agent, or Firm* — Amin, Turocy & Watson, LLP

(57) ABSTRACT

Facilitating antivirus scan filing locking based on cluster lock mechanism in distributed file systems is provided herein. A system comprises a processor and a memory that stores executable instructions that, when executed by the processor, facilitate performance of operations. The operations comprise determining an antivirus scan status of an object, based on an open object request received from a node device of a cluster of node devices, which is determined through the use of Lock Value Blocks. The antivirus scanning of the object is a precondition for opening the object. The antivirus scan status of the object is one of an unscanned status, a queued status, or a scanned status. Further, the operations can comprise, based on the antivirus scan status being the queued status or the scanned status, selectively facilitating the opening of the object at the node device while circumventing the precondition.

20 Claims, 10 Drawing Sheets

FACILITATING ANTIVIRUS SCAN FILING LOCKING BASED ON CLUSTER LOCK MECHANISM IN DISTRIBUTED FILE SYSTEMS

TECHNICAL FIELD

The subject disclosure relates generally to distributed file systems. More specifically, the subject disclosure relates to managing resources based on antivirus scanning in distributed file systems.

BACKGROUND

Distributed storage systems and/or object storage systems can provide a wide range of storage services while achieving high scalability, availability, and serviceability. Operations of distributed storage systems and/or object storage systems can include a lock domain utilized for the purpose of preventing activity until an antivirus scan has been completed. Thus, the lock domain can be utilized for the purpose of preventing file system activity until antivirus scans have been completed. For example, the opening of a file can be blocked until an antivirus scan of the file has been completed in response to the request to open the file. Accordingly, the file can be scanned redundantly since there is no mechanism by which a node can know that another node (or the node itself) has previously submitted the file for antivirus scanning. Accordingly, unnecessary delays can be experienced at the requesting node while waiting for a redundant antivirus scan of the file. Further, the load on antivirus scanners is increased based on the redundant scans.

The above-described context with respect to conventional storage systems is merely intended to provide an overview of current technology and is not intended to be exhaustive. Other contextual description, and corresponding benefits of some of the various non-limiting embodiments described herein, can become further apparent upon review of the following detailed description.

SUMMARY

The following presents a simplified summary of the disclosed subject matter to provide a basic understanding of some aspects of the various embodiments. This summary is not an extensive overview of the various embodiments. It is intended neither to identify key or critical elements of the various embodiments nor to delineate the scope of the various embodiments. Its sole purpose is to present some concepts of the disclosure in a streamlined form as a prelude to the more detailed description that is presented later.

In an embodiment, provided herein is a system that comprises a processor and a memory that stores executable instructions that, when executed by the processor, facilitate performance of operations. The operations can comprise determining an antivirus scan status of an object based on an open object request received from a node device of a cluster of node devices. The antivirus scanning of the object is a precondition for opening the object. The antivirus scan status of the object is one of an unscanned status, a queued status, or a scanned status. Further, the operations can comprise, based on the antivirus scan status being the queued status or the scanned status, selectively facilitating the opening of the object at the node device while circumventing the precondition. The object can be a file stored on a distributed file system. The cluster of node devices can be nodes of a distributed file system.

In some implementations, based on the antivirus scan status being the scanned status and, prior to selectively facilitating the opening of the object at the node device, the operations can comprise, returning a result of a previous scan of the object performed prior to determining the antivirus scan status.

According to some implementations, the operations can comprise, based on the antivirus scan status being the queued status, waiting for completion of a scan of the object and returning a result of the scan of the object after the completion of the scan. Selectively facilitating the opening of the object at the node device can comprise selectively facilitating the opening of the object at the node device based on the result.

In an example, the node device is a first node device. Further, the scanned status is based on a previous scan of the object performed in response to a previous request for the object by the first node device or by a second node device of the cluster of node devices. Additionally, the previous scan was performed prior to determining the antivirus scan status. Also, the previous request was received prior to the open object request being received.

According to another example, the node device is a first node device. The queued status is based on a request to open the object received from a second node device of the cluster of node devices. Additionally, the request to open the object is received prior to receiving the open object request. Further, a scan of the object, based on the request from the second node device, is not completed prior to receiving the open object request.

The operations can comprise, according to some implementations, based on the antivirus scan status being the unscanned status, performing the antivirus scanning of the object in response to the open object request. Further, selectively facilitating the opening of the object at the node device can comprise selectively facilitating the opening of the object at the node device based on performing the antivirus scanning. Further to these implementations, performing the antivirus scanning of the object can comprise storing a result of the antivirus scanning in a data store that is accessible for subsequent antivirus scan status determinations, after the antivirus scanning, for the object or for other objects, other than the object, available for the node devices of the cluster of node devices.

In some implementations, determining the antivirus scan status can comprise receiving a lock value block data and an antivirus domain lock in response to the open object request. Further to these implementations, a value of the lock value block data is a defined fixed data size.

Another embodiment relates to a method that can comprise determining, by a system comprising a processor, an antivirus scan status of an object based on a request to open the object. The request is received from a node of a group of nodes. Further, object antivirus scanning is a prerequisite to an opening of the object. The antivirus scan status of the object is determined to be one from a group of statuses comprising an unscanned status, a queued status, and a scanned status. The method also can comprise, based on the antivirus scan status being the queued status or the scanned status, selectively causing the opening of the object at the node while bypassing the prerequisite, wherein a scan of the object is not performed in response to the request to open the object. The object can be a file stored on a distributed file system. The group of nodes can be nodes of a distributed file system.

In an example, the node is a first node. Further, the scanned status is based on a previous antivirus scan of the object, previous to (e.g., before) determining the antivirus scan status. The previous antivirus scan was performed in response to a previous request for the object, previous to the request, by the first node, or by a second node of the group of nodes.

According to another example, the node is a first node. Further, the queued status is based on a recent request, according to a defined recency criterion, to open the object received from a second node of the group of nodes. The recent request to the open the object is received prior to the receiving the request to open the object. Additionally, the scan of the object is not completed prior to the receiving the request to open the object.

Based on the antivirus scan status being the queued status, the method can comprise, according to some implementations, waiting for completion of the scan of the object and returning a result of the scan of the object after the completion of the scan. Selectively causing the opening of the object at the node comprises selectively causing the opening of the object at the node based on the result.

Another embodiment relates to a non-transitory machine-readable medium, comprising executable instructions that, when executed by a processor, facilitate performance of operations. The operations can comprise determining an antivirus scan state of an object based on a request by node equipment of a group of node equipment to open the object. The antivirus scan state of the object can be a scanned state, an unscanned state, or a queued state. The node equipment is enabled for scanning of objects, including the object, before opening the objects. Additionally, the operations can comprise, based on the antivirus scan state of the object determined to be the scanned state or the queued state, facilitating an opening of the object at the node equipment without an antivirus scan being performed in response to the request.

According to some implementations, the node equipment is a first node equipment and the request is a first request. The queued state is based on a second request from a second node equipment received before the first request. Further, the antivirus scan of the object based on the second request is not completed prior to receipt of the first request.

In some implementations, the node equipment is first node equipment. Further, the scanned state is based on a previous scan, prior to the request. The previous scan is a scan of the object performed in response to a previous request for the object, prior to the request, by the first node equipment or by second node equipment of the group of node equipment.

To the accomplishment of the foregoing and related ends, the disclosed subject matter comprises one or more of the features hereinafter more fully described. The following description and the annexed drawings set forth in detail certain illustrative aspects of the subject matter. However, these aspects are indicative of but a few of the various ways in which the principles of the subject matter can be employed. Other aspects, advantages, and novel features of the disclosed subject matter will become apparent from the following detailed description when considered in conjunction with the drawings. It will also be appreciated that the detailed description can include additional or alternative embodiments beyond those described in this summary.

BRIEF DESCRIPTION OF THE DRAWINGS

Various non-limiting embodiments are further described with reference to the accompanying drawings in which.

DETAILED DESCRIPTION

Figure 1:
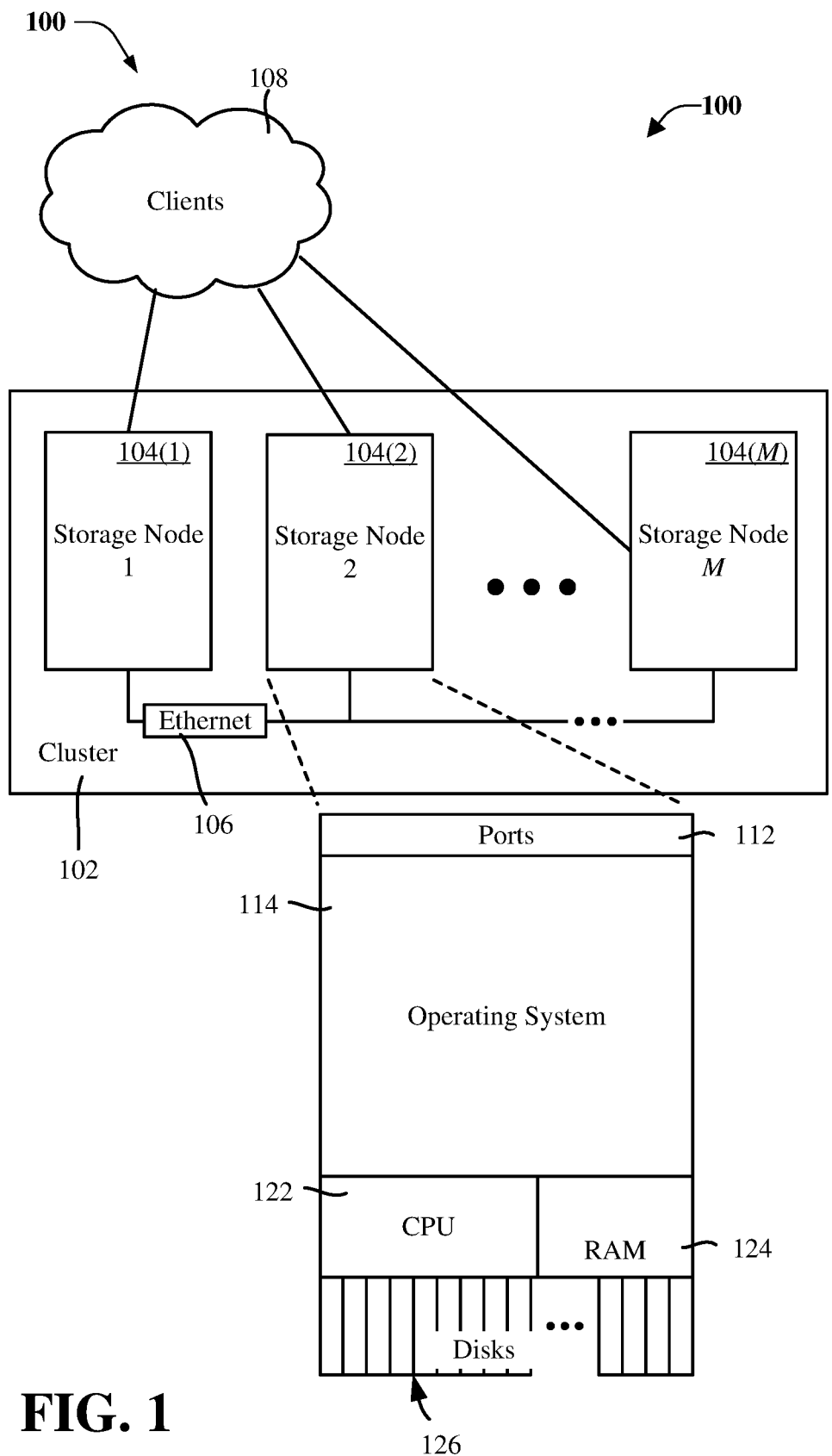
FIG. 1 illustrates an example cluster of computing devices, in accordance with one or more embodiments described herein.

One or more embodiments are now described more fully hereinafter with reference to the accompanying drawings in which example embodiments are shown. In the following description, for purposes of explanation, numerous specific details are set forth in order to provide a thorough understanding of the various embodiments. However, the various embodiments can be practiced without these specific details. In other instances, well-known structures and devices are shown in block diagram form in order to facilitate describing the various embodiments.

In distributed file systems (or storage systems) or cluster file systems for which antivirus scanning of a resource (e.g., an object, a file, and so on) is a prerequisite to opening (e.g., viewing, reading, modifying, writing to, and so on) the resource, a resource can be scanned multiple times and, in some cases, in succession. For example, a file can undergo antivirus scanning and, upon successful completion of the scan, is opened at a first node. A second node requests the file and, after the first node is finished with the file, and prior to opening the file at the second node, the file undergoes a second antivirus scan. Accordingly, redundant scans on a single file can be performed. Further, it is not known which node is performing a scan and, thus, more redundant antivirus scans might be performed.

In order to perform an antivirus scan, the scanning service transfers whole files to an antivirus scanning server (e.g., an Internet Content Adaptation Protocol (ICAP) server). The antivirus scanning protocol (e.g., ICAP protocol) has to transfer an entire file to the server, scan the file, and then bring all the data payload back from the antivirus server, which can take a long time (in terms of how quickly end users want computing systems to respond to requests).

In the interest of obtaining more up to date (e.g., current) feedback about the stages in the antivirus scanning process, the disclosed aspects employ Lock Value Block" (LVB) data and provide better coordination as it relates to antivirus scanning. Further the LVB data can provide information that can be utilized for purposes of debugging or analyzing a cluster to understand what is occurring within the antivirus system.

Accordingly, the various embodiments provided herein include a lock system that has the ability to attach metadata to the locking procedure itself. Once a node is awarded a lock or obtains a shared lock, some additional information about what is going on with respect to the file can be obtained through the use of "Lock Value Blocks" (LVBs). The LVBs can record more status then what is traditionally employed in an antivirus system to advise if a scan is happening. Thus, the system can check first to determine if there is a need to cache data about whether a scan is currently in process and move the file or other resource through the states of antivirus scanning.

Example embodiments are directed to selectively performing antivirus scan on resources (e.g., an object, a file, and so on) within a distributed or cluster file system in which a prerequisite to opening (e.g., viewing, reading, modifying, writing to, and so on) the resource is that the resource undergoes antivirus scanning. As discussed herein, selective performing of the antivirus scan can reduce a load on antivirus servers and can mitigate and/or reduce the number of times an entire resources is sent to and/or from the antivirus server in order for the antivirus scanning to be performed. As an example of selective antivirus scan, if a resource is requested by a node in the file system, and the resource has undergone an antivirus scan, that resource does not need to be scanned again based on the current request. If the resource is currently being scanned, upon or after the scan (and when the resource is available), another antivirus scan does not need to be performed to respond to the request. The determination of whether the resource has been scanned, is currently undergoing an antivirus scan, or has not been scanned, can be based on metadata associated with LVBs. Further aspects and embodiments of this disclosure are described in further detail below.

One example computing platform that can optionally incorporate the antivirus scan filing locking techniques disclosed herein is an ISILON OneFS® cluster provided by DELL®, Inc. It can be appreciated that OneFS® clusters are one of many optional cluster computing technologies, any of which can incorporate the teachings of this disclosure.

FIG. 1 illustrates an example cluster of computing devices, in accordance with one or more embodiments described herein. FIG. 1 includes a cluster 102 of data node devices, referred to in FIG. 1 as storage nodes 104(1), 104(2) . . . 104(M), where M is a positive integer. Each storage node 104(1), 104(2) . . . 104(M) can comprise a computing device. Storage nodes 104(1), 104(2) . . . 104(M) can be configured to serve objects in response to requests from clients 108. Furthermore, typically one of the storage nodes 104(1), 104(2) . . . 104(M) can host a cluster controller virtual machine (not shown in FIG. 1), making that node the cluster controller node which administers the cluster 102. The storage nodes 104(1), 104(2) . . . 104(M) can be coupled to one other via a suitable data communications link comprising interfaces and protocols such as, but not limited to, Ethernet block 106.

Clients 108 can send data system-related requests to the cluster 102, which in general can be configured as one large object namespace. The cluster 102 can maintain an unlimited number of objects (e.g., up to trillions of objects or more). To this end, a node such as the node 104(2) generally comprises ports 112 by which clients 108 connect to the cluster 102. Example ports 112 are provided for requests via various protocols, including but not limited to SMB (Server Message Block), FTP (File Transfer Protocol), HTTP/HTTPS (Hypertext Transfer Protocol), and NFS (Network File System); further, SSH (Secure Shell) allows administration-related requests, for example.

Each node, such as the node 104(2), can include an instance of an operating system 114 (e.g., a OneFS® or other operating system). Each node, such as the node 104(2), can furthermore include a CPU 122, RAM 124, and storage devices such as disks 126. RAM 124 and disks 126 can comprise, for example, volatile memory, nonvolatile memory, hard disk drives, solid-state drives or other types of memory devices. Furthermore, RAM 124 and disks 126 at multiple of the storage nodes 104(1)-104(M), as well as other storage devices attached to the cluster 102, can be used to collectively support a logical disk which provides a shared storage location for the cluster 102.

It is noted that cluster deployments can be of any size. Depending on the needs of a particular organization, some clusters can comprise five or fewer nodes, while large clusters can comprise much larger numbers of nodes. The technologies disclosed herein can be included in clusters of any size.

It is noted that cluster deployments or distributed filesystems (e.g., OneFS® clusters or OneFS® distributed filesystems) can have a lock domain utilized for the purposes of preventing file system activity until antivirus scans have been completed. For example, one mechanism includes blocking the progress of opening files that have yet to be scanned (e.g., the file has to be scanned before permission to open the file is granted). This mechanism is effective but causes the same file to be submitted for scanning redundantly as there is no mechanism by which a node can know that another node has already submitted the file for scan. This can increase a load on external antivirus servers, as well as cause processing delays for opening the file.

Further, OneFS® implements a two-tiered distributed locking system, referred to as "lk." The two-tiered distributed locking system means that locks for a resource are coordinated by a given node, referred to as a coordinator, which can be petitioned for locks by nodes, referred to as initiators, of behalf of threads on the initiator nodes. Thus, when a thread requires a lock to perform work on a resource, that request might need to not only go to it local initiator, but also be sent off-node to the cluster-wide coordinator for that resource before a lock can be granted and the thread can be unblocked.

Accordingly, the various embodiments discussed herein modify the existing lock domain to employ the lock system's ability to transfer data items when locks are granted. Accordingly, the antivirus scanning algorithm can track the scan state of a scan that has been issued across nodes of the cluster. Thus, if an antivirus scan was performed on a resource for one node in the cluster, a second antivirus scan of the same resource does not need to be performed for another node of the cluster. This can reduce the load on external antivirus servers, reduce a processing intensity associated with antivirus scanning prior to opening files, increase processing capability by opening the files quickly, and other benefits.

In a cluster file system, there can be a centralized domain lock manager that is located in a single node and through which the other nodes have to communicate in order to access resources (e.g., objects, files, and so on). The domain lock manager can include a lock domain. In the lock domain shared resources (e.g., a shared file system) can be associated with a set of "locks" that are used to coordinate access to the resources by the nodes. Accordingly, the lock domain can coordinate access to the resources by the nodes. For example, a "lock domain" can be utilized in order to coordinate access to files (or other resources) upon or after the files have been scanned (e.g., an antivirus scan). Thus, any node in a cluster can initiate a scan in order to prove whether the file is "clean" (e.g., no viruses detected) or needs to be quarantined and access denied until the file can be fixed (e.g., the virus removed or rendered harmless).

Figure 2:
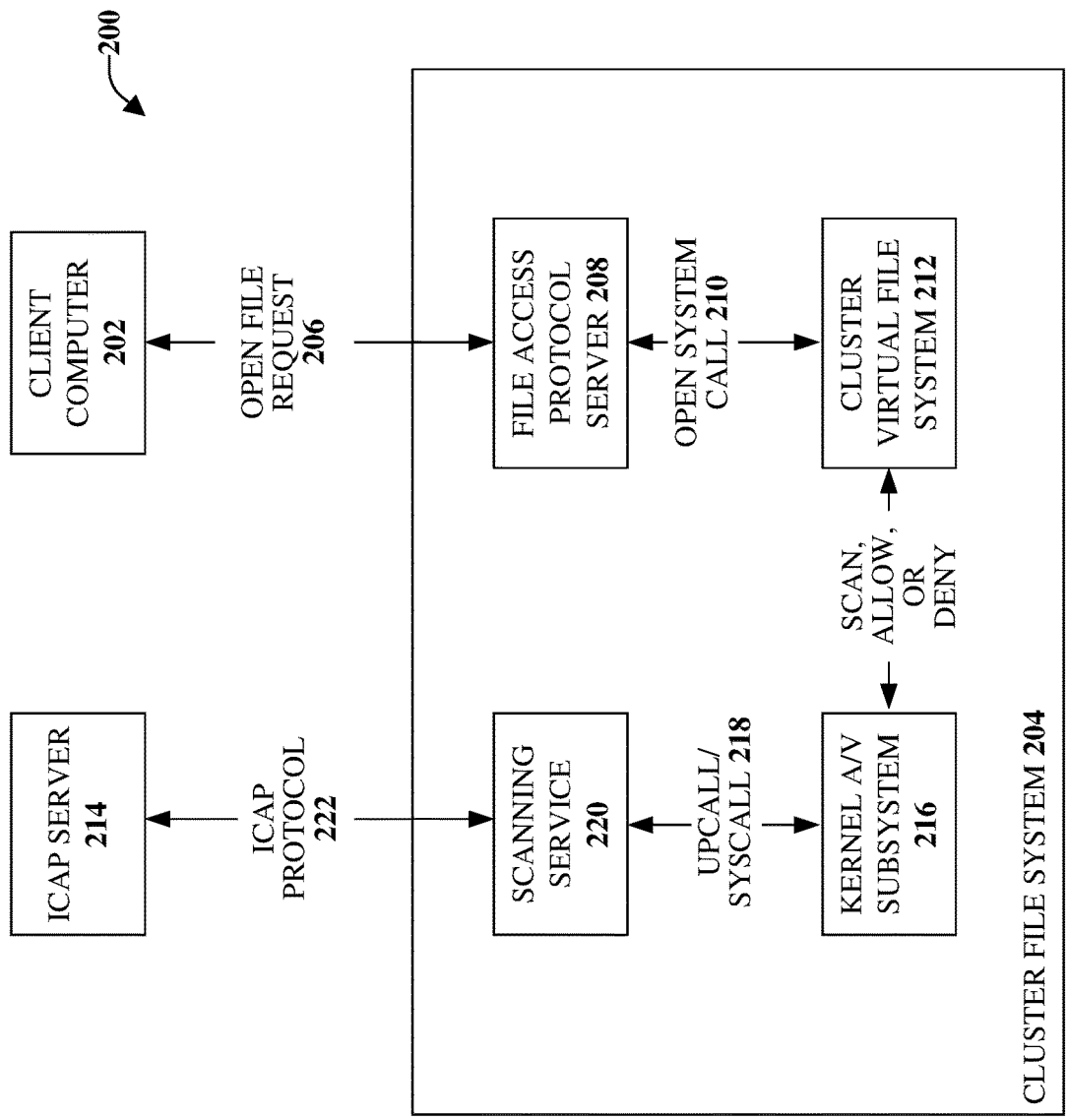
FIG. 2 illustrates a flow diagram of an example, non-limiting, computer-implemented method that opens an object or file in a distributed filesystem that employs antivirus scanning of the object as a precondition for opening the object in accordance with one or more embodiments described herein.

By way of example and not limitation, FIG. 2 illustrates a flow diagram of an example, non-limiting, computer-implemented method 200 that opens an object or file in a distributed filesystem that employs antivirus scanning of the object as a precondition for opening the object in accordance with one or more embodiments described herein.

Illustrated is a client computer 202 (or more than one client computer) that is associated with a cluster filesystem 204 (e.g., a OneFS® cluster). The client computer 202 can send an open file request 206, which can be received by a file access protocol server 208. Upon or after receipt of the open file request 206, the file access protocol server 208 sends an open system call 210 to a cluster virtual file system 212.

When the cluster filesystem 204 is configured to enable antivirus scanning, the cluster filesystem 204 is first configured with a set of Internet Content Adaptation Protocol (ICAP) antivirus scanning servers (e.g., ICAP servers 214). The ICAP servers 214 can include services that are provided by a third-party.

Additionally, when a cluster filesystem 204 is configured to scan files on open, the first access of any file is blocked by the cluster file system's "open" algorithm itself until a scan has been completed. Scans are decoupled from the cluster file system's kernel (e.g., a kernel antivirus subsystem 216) by using an event channel as a work queue.

The mechanism of antivirus scanning is performed by a user space server, which wakes up when data arrives on the event channel, such as an upcall and/or syscall 218. The server or scanning service 220 then sends the file to the configured ICAP server 214 based on an ICAP protocol 222. The ICAP server 214 replies with whether or not a file is infected with a virus. This status is reported to the kernel (e.g., the kernel antivirus subsystem 216) via a system call, which will then unblock the "open" request returning either the appropriate file descriptor or error code to the calling process. Part of the response from the user space to the kernel includes the IStag (ICAP Service Tag). The IStag is stored with the dinode (on-disk inode) for later reference as part of completing the scan.

Once the kernel enqueues a file work item for scan, the kernel employs an internal mechanism to restart the open operation, referred to an "oprestart." This oprestart blocks in the same antivirus domain locks used by the scan.

Inefficiencies exist in the way in which the enqueue works to the userspace service. It is possible for multiple threads across nodes in the cluster to generate the same work to scan the same file redundantly as there is no manner of tracking the implicit state machine across nodes in the existing system.

Many cluster filesystems (e.g., a OneFS®) have not utilized enhancements to the lock system enabling some data to be communicated along with lock grants on cluster resources. The antivirus lock domain already has levels of exclusivity in place that are meant to quiesce the activity in the cluster around yet to be scanned files. While this is mostly successful, it is possible for multiple threads to enter certain levels of the OneFS® kernel simultaneously, redundantly queuing the same file for scan at ICAP servers. By including lock value block data with antivirus domain locks, the various embodiments discussed herein can share portions of a given node's state machine across locks on the same node as well as nodes across the cluster, mitigating or preventing redundant queuing of work to customer ICAP servers.

It is noted that, a requirement of lock value blocks is that the value be a fixed data size. By employing an algebraic data type (specifically as sum type), the upper bound size of the data can be computed in order to meet the requirement of lock value blocks. Further, by employing the algebraic data type, the various states of a file under scan can be expressed. Such states can include an unscanned state, a queued state, and a scanned state (including the results of the scan). Scan results themselves can be implemented as a sum type of fixed size. Since all components of the state are fixed size values, they meet the requirements of a lock value block. In this way, not only can better synchronization across cluster nodes performing antivirus scans be performed, but some fairly rich diagnostic data as to the state of the overall system can be provided as discussed herein.

As mentioned, the lock value blocks should be a fixed data size. The lock domain allows the data size to be specified, or predefined. For example, in the antivirus block domain, a form of serialization for putting the lock value data in with the lock messages can be defined. In order for that to be optimized or lined appropriately for everything to function appropriately, it is a fixed data size requirement from the lock system. Historically, lock value blocks have been used as 64 bit, however, the disclosed embodiments are not limited to 64 bits. Instead, any size can be utilized, provided the size is pre-defined.

The algebraic data type can be a sum type. In C-programming language this is considered a union. For the data that is to be cached in the lock value blocks, using that type of a construct allows for the fixed size to be always the maximum size of one of many options that could potentially be contained within a payload. So, for example, if a third option scan including the result of the scan happens to be the largest payload of the three option scans, then every payload that comes across will always be that size. Accordingly, it can be determined, upon receipt, whether it is a first option, a second option, or a third option. This provides the flexibility to use dynamically sized payloads within a fixed size payload by treating it as a subtype or a discriminate where it can be determined what is actually in the payload as it is being unmarshalled.

There are interesting edges in the flow chart of FIG. 2 where it is possible to perform redundant scans on a single file and/or not know which node is performing a scan. Accordingly, the various embodiments provided herein include a lock system that has the ability to attach metadata to the locking procedure itself. Once a node is awarded a lock or obtains a shared lock, some additional information about what is occurring with respect to the file can be obtained through the use of LVBs. The LVBs can record more status then what is traditionally employed in an antivirus system to advise if a scan is occurring. Thus, the system can check first if there is a need to cache data about whether a scan is currently in process and move it through the states. The scanning service has to transfer whole or complete files to the ICAP server. So, the ICAP protocol has to transfer an entire file to a server and have it scanned and bring all the data payload back, which can take a long time. In the interest of getting more up to date feedback about the stages in the antivirus scanning process, with the disclosed embodiments, the LVB data is employed in the antivirus procedure, which can provide better coordination as well as data to entities that are debugging or looking at a cluster to understand what is happening in the antivirus system.

Figure 3:
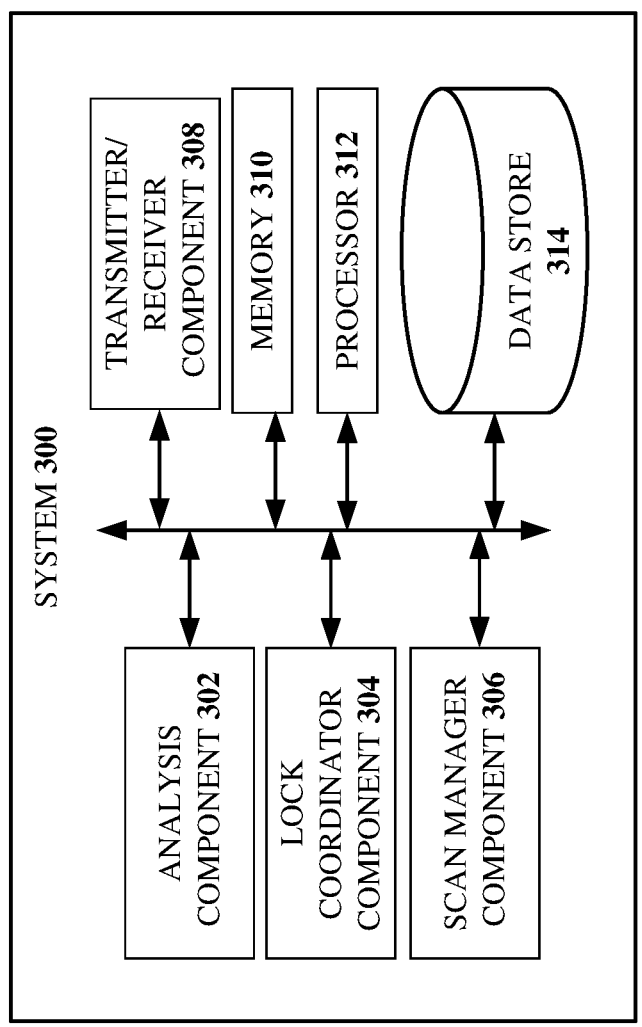
FIG. 3 illustrates an example, non-limiting, system for facilitating antivirus scan filing locking based on cluster lock mechanism in distributed file systems in accordance with one or more embodiments described herein.

FIG. 3 illustrates an example, non-limiting, system 300 for facilitating antivirus scan filing locking based on cluster lock mechanism in distributed file systems in accordance with one or more embodiments described herein. The system 300 can comprise one or more of the components and/or functionality of the computing devices of FIG. 1 and/or the computer-implemented method 200 of FIG. 2, and vice versa.

Aspects of systems (e.g., the system 300 and the like), devices, apparatuses, and/or processes explained in this disclosure can constitute machine-executable component(s) embodied within machine(s) (e.g., embodied in one or more computer readable mediums (or media) associated with one or more machines). Such component(s), when executed by the one or more machines (e.g., computer(s), computing device(s), virtual machine(s), and so on) can cause the machine(s) to perform the operations described.

In various embodiments, the system 300 can be any type of component, machine, device, facility, apparatus, and/or instrument that comprises a processor and/or can be capable of effective and/or operative communication with a wired and/or wireless network. Components, machines, apparatuses, devices, facilities, and/or instrumentalities that can comprise the system 300 can include tablet computing devices, handheld devices, server class computing machines and/or databases, laptop computers, notebook computers, desktop computers, cell phones, smart phones, consumer appliances and/or instrumentation, industrial and/or commercial devices, hand-held devices, digital assistants, multimedia Internet enabled phones, multimedia players, and the like.

The system 300 can comprise an analysis component 302, a lock coordinator manager component 304, a scan manager component 306, a transmitter/receiver component 308, at least one memory 310, at least one processor 312, and at least one data store 314. The analysis component 302 can determine an antivirus scan status or state of an object. The object can be, for example, a file stored on a distributed file system or another type of computer readable data stored on the distributed file system. In an example, upon or after an open object request (e.g., a request to open an object) is received (e.g., via the transmitter/receiver component 308), the analysis component 302 can evaluate the antivirus scan status of the object being requested. It is noted that the system 300 is configured such that antivirus scanning of objects is a precondition for opening the objects. To evaluate the antivirus scan status of the object, the analysis component 302 can determine whether a flag or binary value in a data structure definition of the object (or in a Lock Value Block (LBV) associated with the object) is in a first state, a second state, or a third state.

An LVB can be associated with each resource (e.g., object, file, and so on). The LVB can be read by any process (e.g., executing on a node) that has obtained a lock on the resource (other than a null lock). Further, the LVB can be updated by a process that has obtained a protected update lock or exclusive lock on the resource. For example, the LVB can be updated by a process executing on a node that has obtained an exclusive lock on the resource and an antivirus scan has been performed on the resource. The LVB can include the indication of whether the resource has been scanned, is currently being scanned (e.g., queued), or has not been scanned. For a resource that has been scanned, the LVB can include metadata that includes one or more results of the antivirus scan.

By way of example and not limitation, the first state can be a scanned status, which can indicate that the object was scanned previous to receipt of the open object request. For example, the object could have been previously scanned (and no virus is found or a virus was found) based on a request from a same node from which the object open requested has been received or from another node within a cluster of nodes. Information related to the previous scan can also be provided (e.g., did the object pass the antivirus status, was there a virus found, was the found virus resolved, and so on).

The second state can be a queued status, which indicates that a previous request to open the file has been received from another node within the cluster of nodes and a scan associated with the object has not been completed when the open object request was received (and a scan previous to the request to open the file from the another node was not completed).

The third state can be an unscanned status, which indicates that the object has not been previously scanned prior to the open object request, or has not been scanned since a change to that object has been made and the object stored in a data structure (e.g., the at least one memory 310, the at least one data store 314, and so on). It is noted that although discussed with respect to the first state being the scanned status, the second state being the queued status, and the third state being the unscanned status, the disclosed aspects are not limited to this implementation and, instead the various states can reference any one of the various statuses.

If the status of the object is a scanned status, the lock coordinator manager component 304 grants an open lock for the file without the need for the object to undergo a current antivirus scan (e.g., circumventing the precondition for antivirus scanning of object prior to opening the object). Thus, cluster coherency as it relates to antivirus scanning can be utilized as discussed herein.

If the status of the object is a queued status, the lock coordinator manager component 304 waits until the scan is completed to determine whether an open lock for the object can be granted. In this case, the precondition for antivirus scanning of the object prior to opening the object is partially circumvented because redundant antivirus scans are not needed to be performed. For example, previously one antivirus scan for the previous open request and an additional antivirus scan for the new open request would be performed. Such multiple, redundant antivirus scans are eliminated as discussed herein. The LVBs work when a lock of a certain type is acquired on a resource and the node has a concept of ownership of the LVB. If the node owns it and the data was valid, the node can read it or update it. When the node releases the lock is when the information gets published back to the lock coordinator in the distributed lock system such that when the next locker shows up, it acquires not only the lock, the coordinated access to the resource, it also receives the updated data.

In some cases, if the status of the object is an unscanned status, the scan manager component 306 facilitates the performance of an antivirus scan of the object, the results of which are analyzed by the lock coordinator manager component 304 prior to determining whether an open lock for the object can be granted (e.g., no virus detected) or should be denied (e.g., if a virus is detected). In this case, antivirus scanning of object is performed as the precondition for opening the object.

The at least one memory 310 can be operatively connected to the at least one processor 312. The at least one memory 310 can store executable instructions and/or computer executable components (e.g., the analysis component 302, the lock coordinator manager component 304, the scan manager component 306, the transmitter/receiver component 308, and so on) that, when executed by the at least one processor 312 can facilitate performance of operations (e.g., the operations discussed with respect to the various methods and/or systems discussed herein). Further, the at least one processor 312 can be utilized to execute computer executable components (e.g., the analysis component 302, the lock coordinator manager component 304, the scan manager component 306, the transmitter/receiver component 308, and so on) stored in the at least one memory 310).

For example, the at least one memory 310 can store protocols associated with facilitating antivirus scan file locking based on a cluster lock mechanism in distributed file systems as discussed herein. Further, the at least one memory 310 can facilitate action to control communication between the system 300 and other node devices, one or more file storage systems, one or more devices, such that the system 300 employ stored protocols and/or algorithms to achieve improved overall performance of distributed file systems as described herein.

It should be appreciated that data stores (e.g., memories) components described herein can be either volatile memory or nonvolatile memory, or can include both volatile and nonvolatile memory. By way of example and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of example and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Memory of the disclosed aspects are intended to comprise, without being limited to, these and other suitable types of memory.

The at least one processor 312 can facilitate respective analysis of information related to antivirus scanning and file locking. The at least one processor 312 can be a processor dedicated to analyzing and/or generating information received, a processor that controls one or more components of the system 300, and/or a processor that both analyzes and generates information received and controls one or more components of the system 300.

The transmitter/receiver component 308 can receive one or more requests to open one or more files. Further, the transmitter/receiver component 308 can output respective grants to open the object, write to the object, or perform other functions associated with the object based on the antivirus scanning of the object and the result thereof. The transmitter/receiver component 308 can be configured to transmit to, and/or receive data from, for example, log files, a defined entity, one or more other nodes, and/or other communication devices. Through the transmitter/receiver component 308, the system 300 can concurrently transmit and receive data, can transmit and receive data at different times, or combinations thereof.

Figure 4:
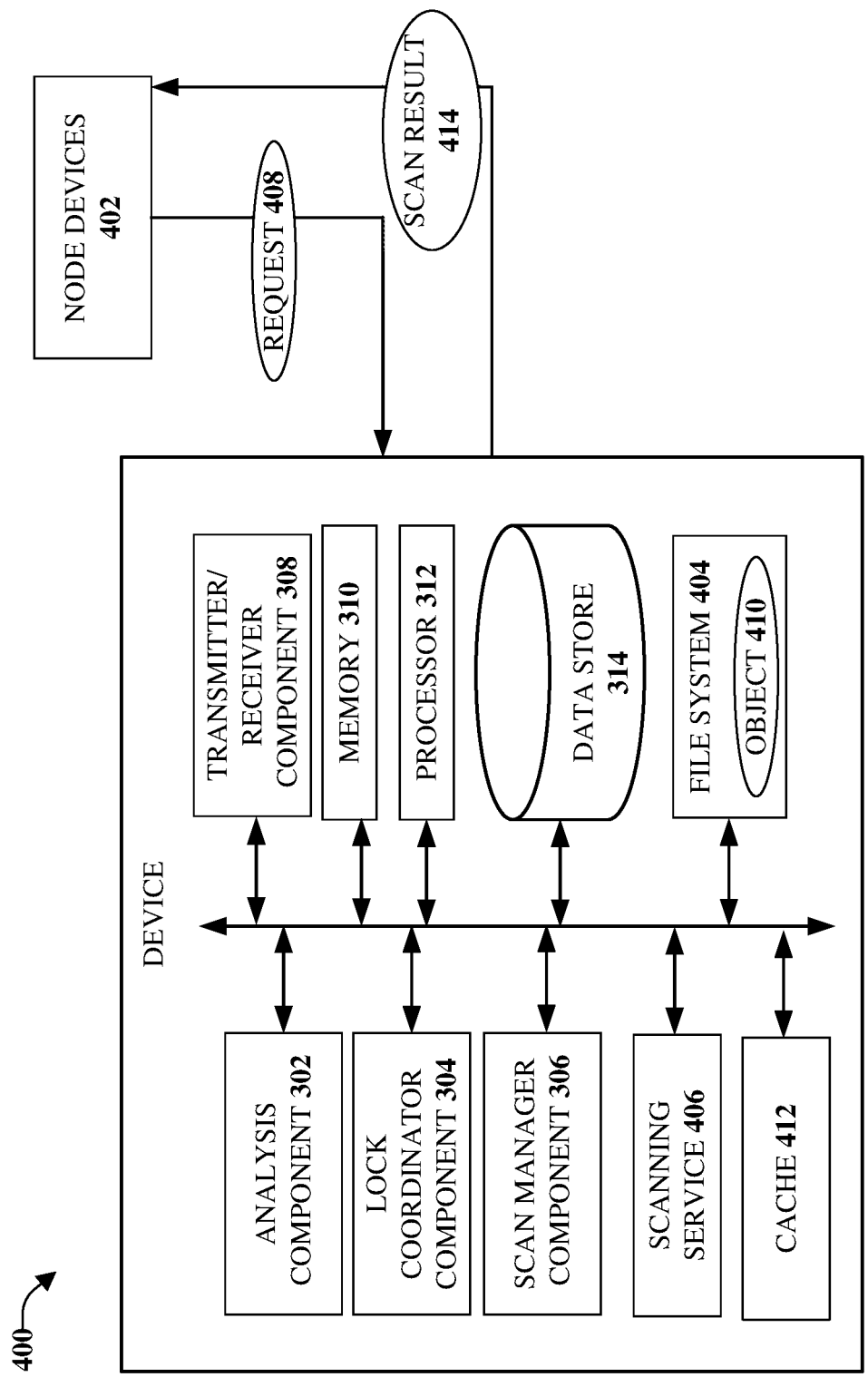
FIG. 4 illustrates an example, non-limiting, system for selective antivirus scanning of objects in distributed file systems in accordance with one or more embodiments described herein.

FIG. 4 illustrates an example, non-limiting, system 400 for selective antivirus scanning of objects in distributed file systems in accordance with one or more embodiments described herein. Repetitive description of like elements employed in other embodiments described herein is omitted for sake of brevity. The system 400 can comprise one or more of the components and/or functionality of the computing devices of FIG. 1, the computer-implemented method 200 of FIG. 2, the system 300 of FIG. 3, and vice versa.

Traditionally, when there is a request to open a file (e.g., to read the file), the entire file is sent to the ICAP server in order for a scan to be performed. A persistent write to the file metadata is performed, which indicates that the file has been scanned as of date "X." Performing persistent writes to the file is reasonably slow. There can be value in the long-term, however, for a highly requested file, more write activity is being performed than what is really necessary. Another issue is that because the write to the file metadata is being performed at the end, after waiting for the ICAP server (which is "off cluster" or not part of the cluster file system), there can be times when a number of requests are being received for the same file. Accordingly, the file is undergoing antivirus scanning many different times (e.g., one time for each node requesting the file, or when a same node closes the file and then another request from that node to open the file is received). Thus, each node obtains the lock, reads the metadata, and, upon or after reading the metadata, determines that the file has not been scanned and the file is sent to the ICAP server for antivirus scan of the file. Thus, the node has to wait until the ICAP server performs the antivirus scan, then goes to write to the file metadata, only to determine that another node has already wrote to the file metadata that the file has already been updated. This is inefficient and increases a processing load on the ICAP server (or other external antivirus scanners or to antivirus scanners internal to the cluster filesystem).

As an improvement to antivirus scanning of resources, a cluster filesystem has a coordinated view of the resource, including whether or not the resource (e.g., the object, the file) has been transmitted to the ICAP server and, thus, does not have to be resent. Instead, the node simply waits and is notified when the file is ready. Further, the disclosed embodiments can coordinate information related to whether the file is clean (e.g., no virus detected), since it has recently been scanned. Further, the requesting node does not need to read the metadata to start using the file based on the indication that the file has been scanned and passed the antivirus scan.

As discussed herein, LVBs are utilized as an implementation of the antivirus system. LVBs have useful properties, are in-line, and do not introduce round trip delays. For example, additional queries to obtain the LVB is not needed.

Instead, the LVB is added onto the request sent by a node in order for that node to gain exclusive access to antivirus properties of the file.

A traditional system uses the concept of an "oprestart" to take locks in the antivirus domain. The oprestart logic causes a process that wants to, on behalf of a client (e.g., a node device), open a file that has not been scanned to essentially do a retry internally until the scan is complete and do some blocking. That thread of execution will just stop there until the scan is completed. But there are inefficiencies in how that work is imputed to the user space service that actually does the scanning, so it is possible for multiple threads across the cluster to generate the same work items and scan the same file. In the end, it is inefficient to send that entire file to the ICAP server multiple times to get scanned.

Depending on how the antivirus blocking is configured, for example, "scan on open," only one particular type of lock can be taken in order to determine the current state of whether something is being scanned or not. Thus, with the disclosed embodiments, the goal is to send the whole file (object or resource) to be scanned for viruses exactly once, if possible, as opposed to sending the file multiple times for multiple nodes. It is noted, however, that in some cases, the locks might be schedule at multiple nodes in the cluster, or two different antivirus scan services on two different cluster nodes to send the file in the existing system to the ICAP server redundantly. However, the goal of the disclosed aspects is to eliminate the need to have to perform a full file transfer to the ICAP server over and over again (e.g., repeatedly, multiple, redundant times). This can be achieved by the synchronization between nodes as discussed herein.

As discussed herein, the number of times the file is scanned is mitigated and/or reduced. It is noted that antivirus scanning can be an expensive operation due, in part, to sending the entire file to the ICAP server. ICAP is a third-party protocol for communicating with antivirus servers, which can be expensive to operate and use.

An issue associated with attaching ICAP systems to a cluster file system is that there has to be a certain number of ICAP servers in order to keep up with the scanning load of the clusters. To reduce the burden or load on the ICAP servers (as well as reduce associated expenses), the various embodiments discussed herein, reduce and/or mitigate the amount of times that files are sent back and forth between the cluster file system and the ICAP servers.

With continuing reference to FIG. 4, the system 400 can comprise a group of node devices 402 (e.g., the client computer 202), a file system 404 (e.g., the cluster virtual file system 212) that includes one or more objects, and a scanning service 406 (e.g., the scanning service 220). The scanning service 406 can be a third-party scanning service according to some implementations. In an alternative implementation, the scanning service 406 can be facilitated and controlled by the system 400 (e.g., the antivirus scanning is not outsourced to a third-party scanning service).

A request 408 can be received from a node device of the group of node devices 402 to open an object (e.g., object 410). The request 408 can be received via the transmitter/receiver component 308. A precondition for opening the file can be that antivirus scanning of the object has to occur prior to a read lock (or a write lock) being granted to the node device. According to some implementations, when a request to access a file is received, the request can be filtered through a SAD (simulation assisted DBSCAN) algorithm.

Upon or after receiving the request 408, the analysis component 302 can access and read LVB data for scan states, such as by checking a cache 412, to determine if the object being requested is in a scanned state, a queued state, or an unscanned state. According to some implementations, the analysis component 302 can evaluate at least one LVB associated with the object to determine the antivirus scan state of the object.

If the analysis component 302 determines the object is in the scanned status, a result 414 of a previous scan of the object can be returned (e.g., from the cache 412) to evaluate the antivirus scanned status (e.g., did the object pass the antivirus scan, did the object fail the antivirus scan, and so on). According to some implementations, the result of the previous scan can be included in metadata of the LVB.

According to some implementations, there is a defined recency criterion associated with a time of the previous scan. For example, if there has been a write to the object and an antivirus scan has not been performed since the updated object has been saved, the LVB data associated with the object can indicate that the object is in an unscanned state (e.g., another antivirus scan should be performed). In another example, the defined recency criterion can be based on a time period. For example, if it has been x number of days (weeks or months) since the last scan, it might be beneficial to perform another scan in case the capability to detect previously undetected viruses has been developed. Accordingly, LVB data associated with the object can indicate that the object is in an unscanned state (e.g., another antivirus scan should be performed) based on the elapsed time period.

The analysis component 302 can determine the antivirus scanned status is a queued status based on the LVB data. For example, the request can be a first request. The queued status can be based on a second request from a second node equipment received before the first request. The scan of the object based on the second request is not completed prior to receipt of the first request. Thus, the first request (e.g., the request from the node device) is delayed until the antivirus scan is completed and a lock can be granted to the node device.

For example, the lock coordinator manager component 304 can wait for completion of the scan of the object. The result 414 of the scan of the object after the completion of the scan can be returned to the node device. The object can be opened at the node device based on the result of the scan.

Based on the analysis component 302 determining the antivirus scan status is the unscanned status, the antivirus scanning of the object is performed (e.g., via the scanning service 406) in response to the open object request. The object can be selectively opened at the node device based on the result of the antivirus scanning.

Figure 5:
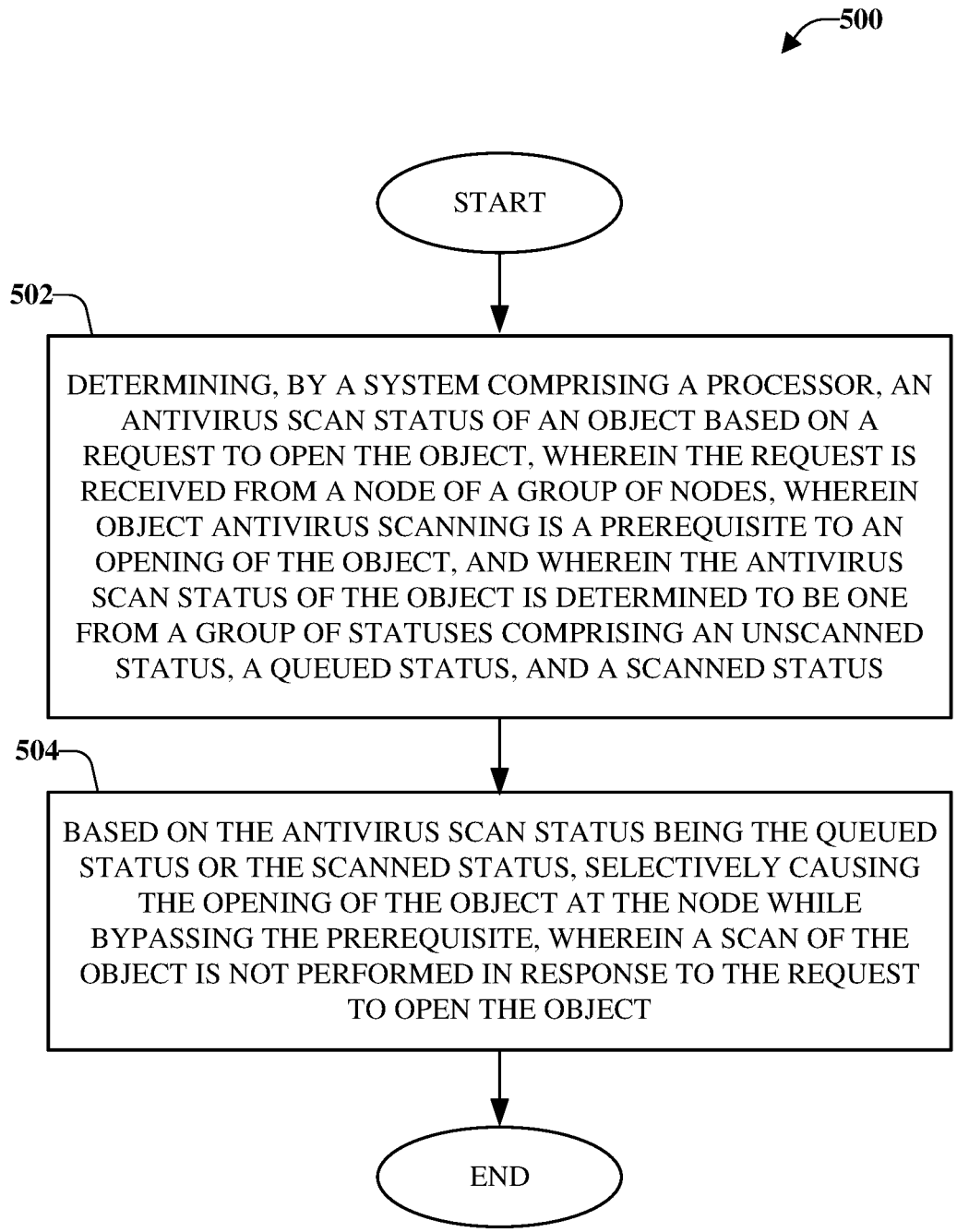
FIG. 5 illustrates a flow diagram of an example, non-limiting, computer-implemented method that mitigates the amount of redundant antivirus scans associated with one or more resources based on antivirus scans performed on the object cluster-wide in accordance with one or more embodiments described herein

FIG. 5 illustrates a flow diagram of an example, non-limiting, computer-implemented method 500 that mitigates the amount of redundant antivirus scans associated with one or more resources based on antivirus scans performed on the object cluster-wide in accordance with one or more embodiments described herein.

As discussed herein, the various embodiments are configured to perform an antivirus scan on an object as few times as possible. There will be some edge cases where an object will still be sent for antivirus scanning multiple times because some edge cases might involve node failures in the middle of the operation, and it will not scan. However, with the embodiments provided herein, the number of times an object is redundantly scanned are much fewer in number than systems that do not employ the disclosed embodiments. The scan still has to complete so doing more than once is better than never performing the scan, but it should be performed as little as possible. This can be achieved by utilizing the lock value blocks as discussed herein.

The computer-implemented method 500 starts, at 502 when a system comprising a processor determines an antivirus scan status of an object based on a request to open the object (e.g., via the analysis component 302 and the transmitter/receiver component 308). The request is received from a node of a group of nodes (e.g., the group of node devices 402). Object antivirus scanning can be a prerequisite to an opening of the object by the node devices of the group of node devices. To determine the antivirus scan status, at least one LVB associated with the resource can be evaluated.

Further, the antivirus scan status of the object can be determined to be one from a group of statuses comprising an unscanned status, a queued status, and a scanned status. The unscanned status can indicate that the object being requested has not had an antivirus scan performed to determine the virus status of the object. The queued status can indicate that another node device has requested the object and it is currently undergoing an antivirus scan and does not need to undergo another antivirus scan based on the request received from the node device. Further, the scanned status can indicate that the object has been scanned and does not need to undergo another antivirus scan based on the request received from the node device.

At 504, based on the antivirus scan status being the queued status or the scanned status, the system can selectively cause the opening of the object at the node while bypassing the prerequisite. Thus, a scan of the object is not performed in response to the request to open the object. Accordingly, better synchronization across cluster nodes (e.g., the group of node devices) performing antivirus scans can be provided. Further, diagnostic data as to the state of the overall system can be determined based on the synchronization across cluster nodes.

Figure 6:
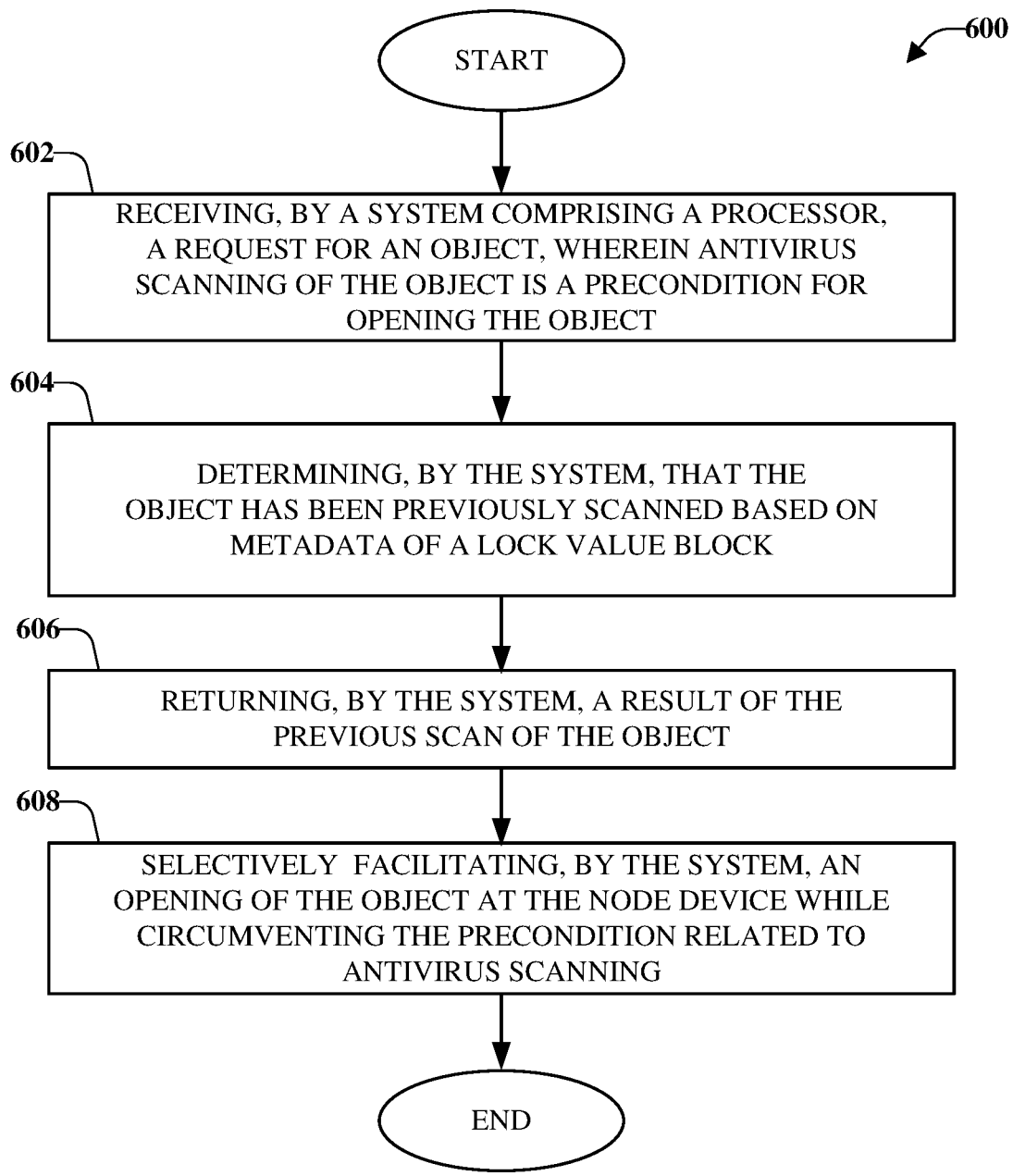
FIG. 6 illustrates a flow diagram of an example, non-limiting, computer-implemented method that bypasses a mandatory antivirus scan of an object based on a previous scan performed on the object by a node device of a cluster of node devices in accordance with one or more embodiments described herein.

FIG. 6 illustrates a flow diagram of an example, non-limiting, computer-implemented method 600 that bypasses a mandatory antivirus scan of an object based on a previous scan performed on the object by a node device of a cluster of node devices in accordance with one or more embodiments described herein.

The computer-implemented method 600 starts, at 602, when a request for an object is received (e.g., via the transmitter/receiver component 308). The object can be, for example, a file stored on a distributed file system or another type of computer readable data stored on the distributed file system. The request for the object can be received from at least one node device of a group of node devices (e.g., cluster nodes) associated with the distributed file system.

At 604, a determination is made that the object has been previously scanned (e.g., previous to (of substantially the same time as) receiving the request at 602) based on metadata of a lock value block (e.g., via that analysis component 302). Accordingly, the determination is that the state of the object is a scanned state. The previous scan of the object can be based on at least one previous request for the object received from the node device or one or more previous requests received from one or more other nodes of the group of node devices.

A result of the previous scan of the object can be returned, at 606. For example, the scan results can be implemented as a sum type of a fixed size and as a lock value block. Based on the result of the previous scan, at 608, opening of the object at the node device can be selectively facilitated while circumventing the precondition that the object has to be scanned prior to each time the object is opened at a node device. For example, if the previous scan result indicated that the object passed the antivirus scan (e.g., no virus found), the object can be opened at the node device. However, if the previous scan indicated that the object failed the antivirus scan, or is in quarantine, the object is not opened at the node device. Instead, an indication can be output at the node device that the file has not passed the antivirus scan, is under quarantine, or another condition of the object prevents opening of the object at the node device.

Figure 7:
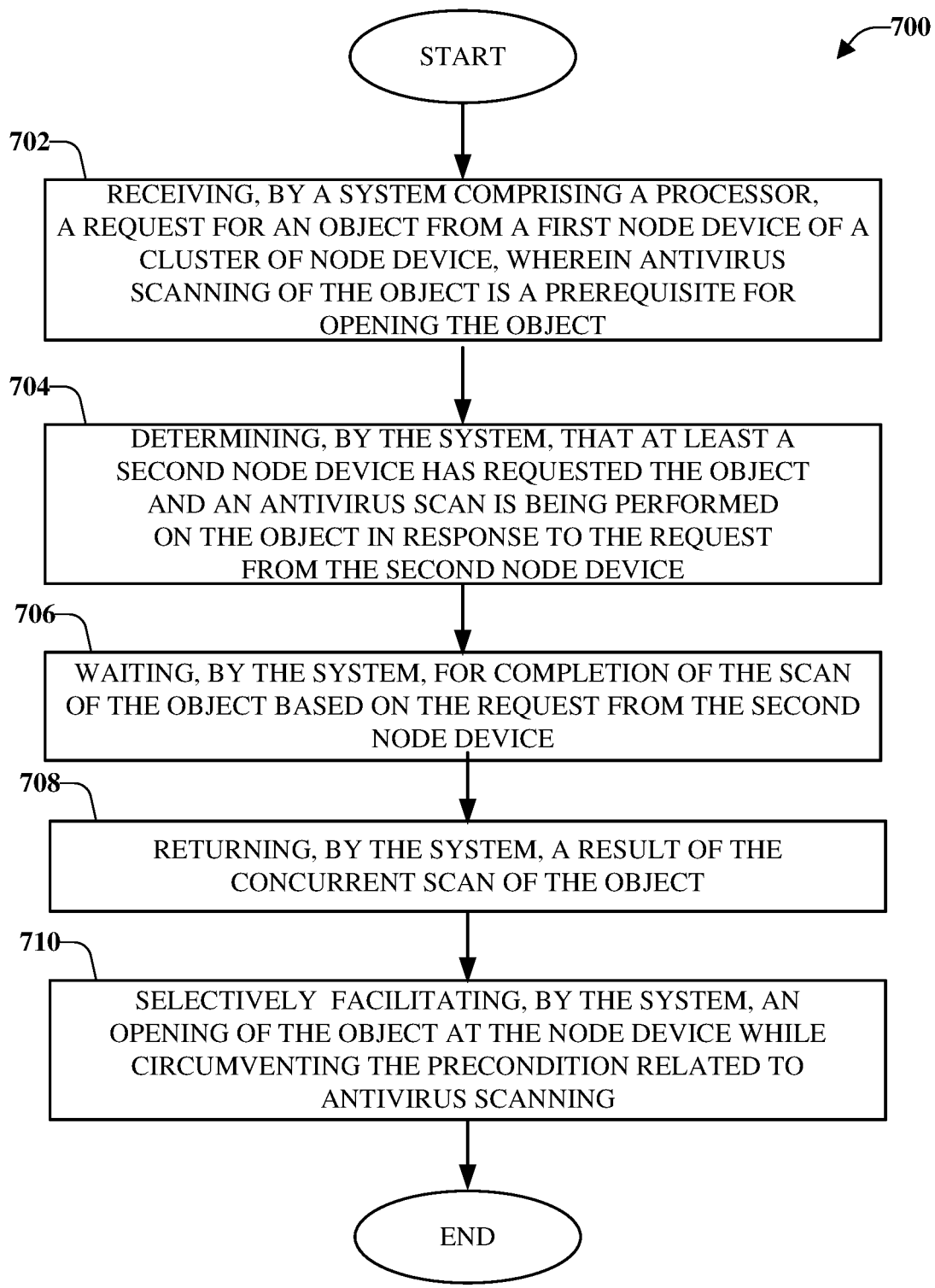
FIG. 7 illustrates a flow diagram of an example, non-limiting, computer-implemented method that bypasses a mandatory antivirus scan of an object based on a concurrent scan being performed on the object based on another request for the object in accordance with one or more embodiments described herein.

FIG. 7 illustrates a flow diagram of an example, non-limiting, computer-implemented method 700 that bypasses a mandatory antivirus scan of an object based on a concurrent scan being performed on the object based on another request for the object in accordance with one or more embodiments described herein.

The computer-implemented method 700 starts, at 702, when a request to open an object is received from a first node device of a group of node devices (e.g., cluster nodes) associated with the distributed file system (e.g., via a transmitter/receiver component 308). The object can be, for example, a file stored on a distributed file system or another type of computer readable data stored on the distributed file system. A prerequisite for opening the object can be that an antivirus scan has to be performed on the object.

A determination is made, at 704, that at least a second node device has requested the object and an antivirus scan is being performed on the object in response to the request from the second node device (e.g., via the analysis component 302). The determination that the antivirus scan is being performed is based on an LVB associated with the requested object. For example, prior to receiving the request at 702, the second node device could have requested the object and a determination could have been that the object has not previously undergone an antivirus scan. Accordingly, an antivirus scan is currently being performed based on the request from the second node device and, further, the antivirus scan has not completed when the request from the first node device was received.

Accordingly, at 706, the computer-implemented method 700 waits for completion of the scan of the object based on the request from the second node device. Upon or after completion of the scan, the results can be returned to the second node device and opening of the object at the second node device can be facilitated based on the results of the antivirus scan. Further, at 708, the results of the antivirus can be output, at 708, based on the request received from the first node device. The results output at 708 are the results of the antivirus scan performed with respect to the request from the second node device. The results can be included in metadata of the LVB.

At 710, the object is output at the first node device based on results of the antivirus scan performed with respect to the request from the second node device. Accordingly, if no virus was found during that antivirus scan, the object can be opened at the first node device. However, if a virus was found during that antivirus scan, opening of the object at the first node device (and the second node device) can be denied, or allowed after action is taken to remove the virus. Accordingly, the object can be selectively opened at the first node device while bypassing the prerequisite that an antivirus scan has to be performed each time before an object can be opened at a node device.

Figure 8:
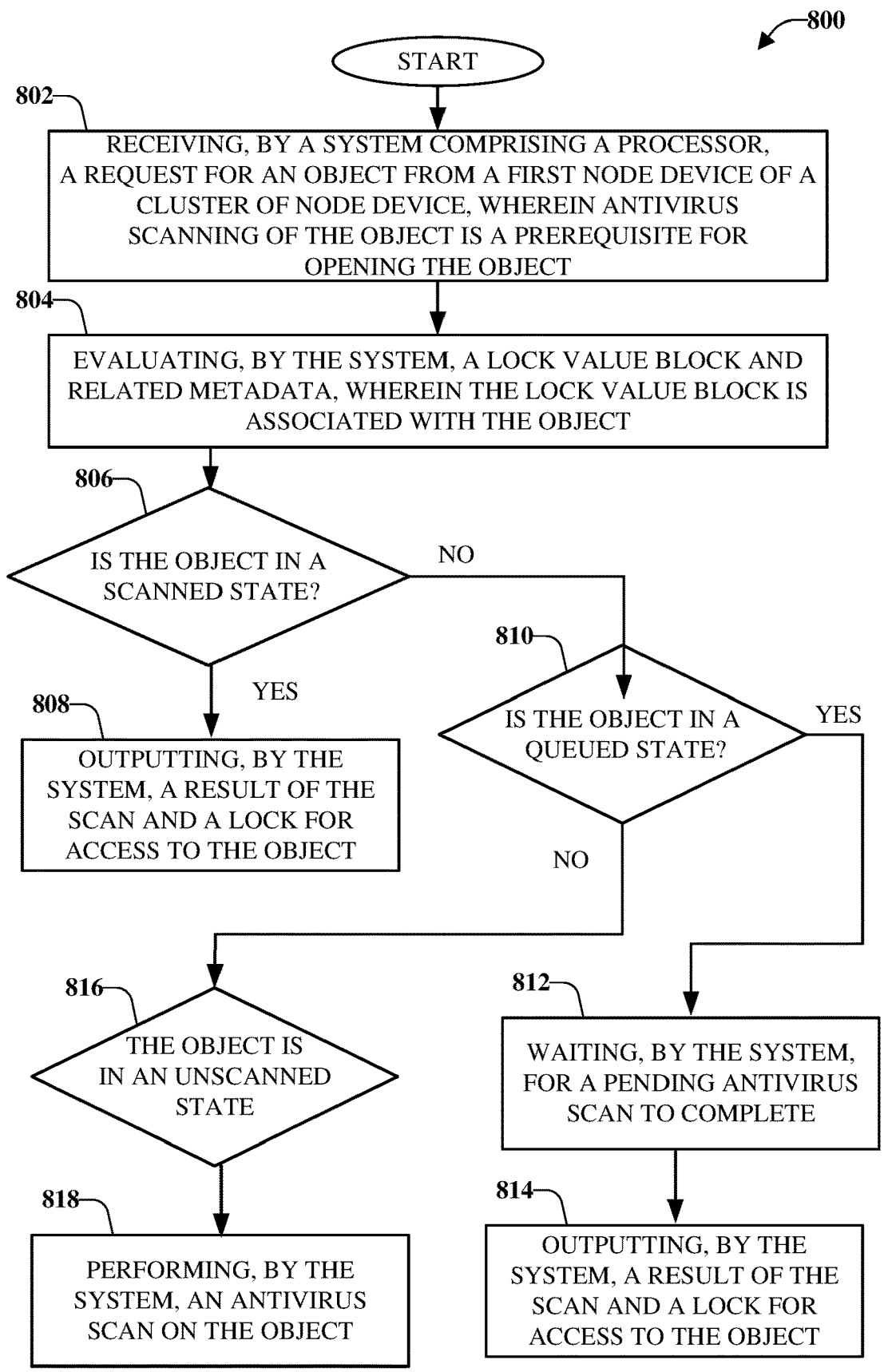
FIG. 8 illustrates a flow diagram of an example, non-limiting, computer-implemented method that selectively bypasses a mandatory antivirus scan of an object based on lock value blocks associated with the object in accordance with one or more embodiments described herein.

FIG. 8 illustrates a flow diagram of an example, non-limiting, computer-implemented method 800 that selectively bypasses a mandatory antivirus scan of an object based on lock value blocks associated with the object in accordance with one or more embodiments described herein.

The computer-implemented method 800 starts, at 802, when a request to open an object is received from a node of a group of nodes (e.g., cluster nodes) associated with the distributed or cluster file system. The object can be, for example, a file stored on a distributed file system or another type of computer readable data stored on the distributed file system. A prerequisite for opening the object can be that an antivirus scan has to be performed on the object.

A Lock Value Block (LVB) and related metadata is evaluated, at 804. The lock value block is associated with the object and includes information related to an antivirus scan status of the object. Based on the evaluation, at 806, a determination is made whether the LVB indicates the object is in a scanned state. If in the scanned state ("YES"), at 808, a result of the scan based on the metadata is output and a lock can be selectively granted to the node.

If the determination is that the object is not in the scanned state ("NO"), at 810, a determination is made whether the object is in a queued state based on the LVB data. If the object is in the queued state ("YES"), at 812, the system waits for a pending antivirus scan of the object to complete. The results of the antivirus scan can be added to metadata of the LVB. Upon or after completion of the antivirus scan, at 814, a result of the scan based on the metadata is output and a lock can be selectively granted to the node.

If the object is not in the queued state ("NO"), it is determined that the object is in the unscanned state, at 816. An antivirus scan can be performed at 818. A result of the antivirus scan can be added to metadata of the LVB and a lock can be selectively granted to the node.

Accordingly, in certain situations, the prerequisite for an antivirus scan to be performed before an object can be opened can be bypassed. This can reduce the load on antivirus servers as well as increase a processing efficiency and increase a processing time associated with opening files in a cluster file system.

It is noted that although FIG. 8 is discussed with determining the antivirus scan state of the object in a particular order, the disclosed embodiments are not limited to this order. Instead, the antivirus scan state of the object can be determined in a different order. Alternatively, the antivirus scan state of the object can be determined in a single step, based on reviewing the LVB data and associated metadata.

Methods that can be implemented in accordance with the disclosed subject matter, will be better appreciated with reference to the flow charts provided herein. While, for purposes of simplicity of explanation, the methods are shown and described as a series of blocks, it is to be understood and appreciated that the disclosed aspects are not limited by the number or order of blocks, as some blocks can occur in different orders and/or at substantially the same time with other blocks from what is depicted and described herein. Moreover, not all illustrated blocks can be required to implement the disclosed methods. It is to be appreciated that the functionality associated with the blocks can be implemented by software, hardware, a combination thereof, or any other suitable means (e.g., device, system, process, component, and so forth). Additionally, it should be further appreciated that the disclosed methods are capable of being stored on an article of manufacture to facilitate transporting and transferring such methods to various devices. Those skilled in the art will understand and appreciate that the methods could alternatively be represented as a series of interrelated states or events, such as in a state diagram.

As used herein, the term "storage device," "first storage device," "second storage device," "storage cluster nodes," "storage system," and the like (e.g., node device), can include, for example, private or public cloud computing systems for storing data as well as systems for storing data comprising virtual infrastructure and those not comprising virtual infrastructure. The term "I/O request" (or simply "I/O") can refer to a request to read and/or write data.

The term "cloud" as used herein can refer to a cluster of nodes (e.g., set of network servers), for example, within a distributed object storage system, that are communicatively and/or operatively coupled to one another, and that host a set of applications utilized for servicing user requests. In general, the cloud computing resources can communicate with user devices via most any wired and/or wireless communication network to provide access to services that are based in the cloud and not stored locally (e.g., on the user device). A typical cloud-computing environment can include multiple layers, aggregated together, that interact with one another to provide resources for end-users.

Further, the term "storage device" can refer to any Non-Volatile Memory (NVM) device, including Hard Disk Drives (HDDs), flash devices (e.g., NAND flash devices), and next generation NVM devices, any of which can be accessed locally and/or remotely (e.g., via a Storage Attached Network (SAN)). In some embodiments, the term "storage device" can also refer to a storage array comprising one or more storage devices. In various embodiments, the term "object" refers to an arbitrary-sized collection of user data that can be stored across one or more storage devices and accessed using I/O requests.

Further, a storage cluster can include one or more storage devices. For example, a distributed storage system can include one or more clients in communication with a storage cluster via a network. The network can include various types of communication networks or combinations thereof including, but not limited to, networks using protocols such as Ethernet, Internet Small Computer System Interface (iSCSI), Fibre Channel (FC), and/or wireless protocols. The clients can include user applications, application servers, data management tools, and/or testing systems.

As utilized herein an "entity," "client," "user," and/or "application" can refer to any system or person that can send I/O requests to a storage system. For example, an entity, can be one or more computers, the Internet, one or more systems, one or more commercial enterprises, one or more computers, one or more computer programs, one or more machines, machinery, one or more actors, one or more users, one or more customers, one or more humans, and so forth, hereinafter referred to as an entity or entities depending on the context.

Figure 9:
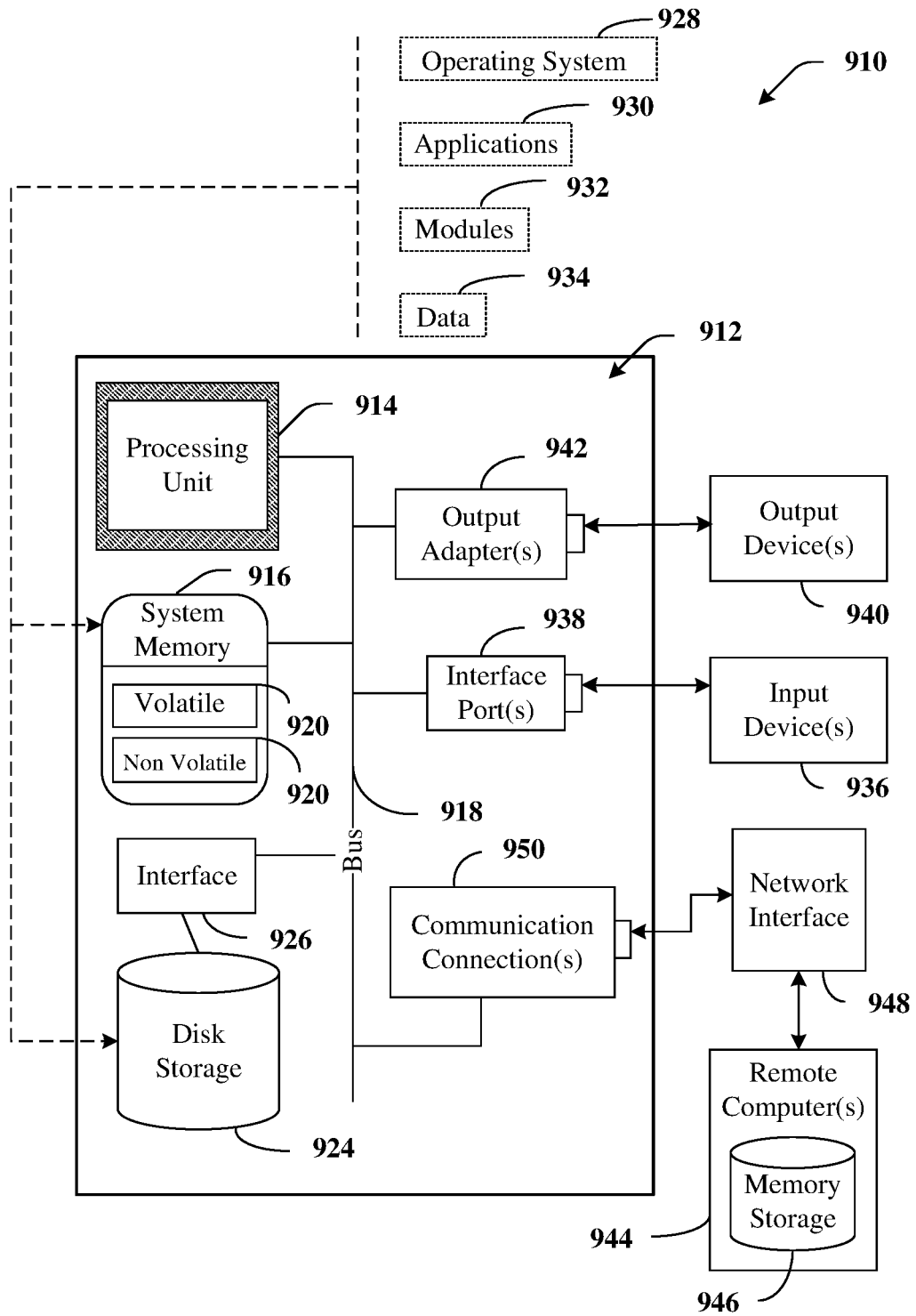
FIG. 9 illustrates an example, non-limiting, computing environment in which one or more embodiments described herein can be facilitated.

In order to provide a context for the various aspects of the disclosed subject matter, FIG. 9 as well as the following discussion are intended to provide a brief, general description of a suitable environment in which the various aspects of the disclosed subject matter can be implemented.

With reference to FIG. 9, an example environment 910 for implementing various aspects of the aforementioned subject matter comprises a computer 912. The computer 912 comprises a processing unit 914, a system memory 916, and a system bus 918. The system bus 918 couples system components including, but not limited to, the system memory 916 to the processing unit 914. The processing unit 914 can be any of various available processors. Multi-core microprocessors and other multiprocessor architectures also can be employed as the processing unit 914.

The system bus 918 can be any of several types of bus structure(s) including the memory bus or memory controller, a peripheral bus or external bus, and/or a local bus using any variety of available bus architectures including, but not limited to, 8-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCMCIA), and Small Computer Systems Interface (SCSI).

The system memory 916 comprises volatile memory 920 and nonvolatile memory 922. The basic input/output system (BIOS), containing the basic routines to transfer information between elements within the computer 912, such as during start-up, is stored in nonvolatile memory 922. By way of illustration, and not limitation, nonvolatile memory 922 can comprise read only memory (ROM), programmable ROM (PROM), electrically programmable ROM (EPROM), electrically erasable PROM (EEPROM), or flash memory. Volatile memory 920 comprises random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DR-RAM).

Computer 912 also comprises removable/non-removable, volatile/non-volatile computer storage media. FIG. 9 illustrates, for example a disk storage 924. Disk storage 924 comprises, but is not limited to, devices like a magnetic disk drive, floppy disk drive, tape drive, Jaz drive, Zip drive, LS-100 drive, flash memory card, or memory stick. In addition, disk storage 924 can comprise storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage 924 to the system bus 918, a removable or non-removable interface is typically used such as interface 926.

It is to be appreciated that FIG. 9 describes software that acts as an intermediary between users and the basic computer resources described in suitable operating environment 910. Such software comprises an operating system 928. Operating system 928, which can be stored on disk storage 924, acts to control and allocate resources of the computer 912. System applications 930 take advantage of the management of resources by operating system 928 through program modules 932 and program data 934 stored either in system memory 916 or on disk storage 924. It is to be appreciated that one or more embodiments of the subject disclosure can be implemented with various operating systems or combinations of operating systems.

A user enters commands or information into the computer 912 through input device(s) 936. Input devices 936 comprise, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 914 through the system bus 918 via interface port(s) 938. Interface port(s) 938 comprise, for example, a serial port, a parallel port, a game port, and a universal serial bus (USB). Output device(s) 940 use some of the same type of ports as input device(s) 936. Thus, for example, a USB port can be used to provide input to computer 912, and to output information from computer 912 to an output device 940. Output adapters 942 are provided to illustrate that there are some output devices 940 like monitors, speakers, and printers, among other output devices 940, which require special adapters. The output adapters 942 comprise, by way of illustration and not limitation, video and sound cards that provide a means of connection between the output device 940 and the system bus 918. It should be noted that other devices and/or systems of devices provide both input and output capabilities such as remote computer(s) 944.

Computer 912 can operate in a networked environment using logical connections to one or more remote computers, such as remote computer(s) 944. The remote computer(s) 944 can be a personal computer, a server, a router, a network PC, a workstation, a microprocessor based appliance, a peer device or other common network node and the like, and typically comprises many or all of the elements described relative to computer 912. For purposes of brevity, only a memory storage device 946 is illustrated with remote computer(s) 944. Remote computer(s) 944 is logically connected to computer 912 through a network interface 948 and then physically connected via communication connection 950. Network interface 948 encompasses communication networks such as local-area networks (LAN) and wide-area networks (WAN). LAN technologies comprise Fiber Distributed Data Interface (FDDI), Copper Distributed Data Interface (CDDI), Ethernet/IEEE 802.3, Token Ring/IEEE 802.5, and the like. WAN technologies comprise, but are not limited to, point-to-point links, circuit switching networks like Integrated Services Digital Networks (ISDN) and variations thereon, packet switching networks, and Digital Subscriber Lines (DSL).

Communication connection(s) 950 refers to the hardware/software employed to connect the network interface 948 to the system bus 918. While communication connection 950 is shown for illustrative clarity inside computer 912, it can also be external to computer 912. The hardware/software necessary for connection to the network interface 948 comprises, for exemplary purposes only, internal and external technologies such as, modems including regular telephone grade modems, cable modems and DSL modems, ISDN adapters, and Ethernet cards.

Figure 10:
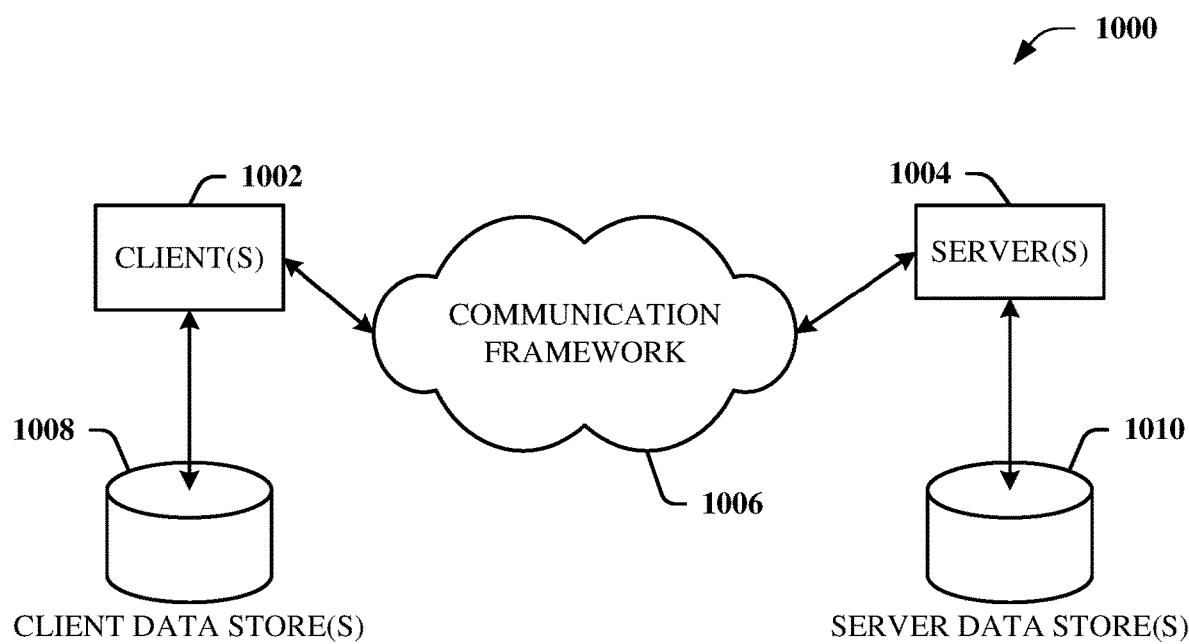
FIG. 10 illustrates an example, non-limiting, networking environment in which one or more embodiments described herein can be facilitated.

FIG. 10 is a schematic block diagram of a sample computing environment 1000 with which the disclosed subject matter can interact. The sample computing environment 1000 includes one or more client(s) 1002. The client(s) 1002 can be hardware and/or software (e.g., threads, processes, computing devices). The sample computing environment 1000 also includes one or more server(s) 1004. The server(s) 1004 can also be hardware and/or software (e.g., threads, processes, computing devices). The servers 1004 can house threads to perform transformations by employing one or more embodiments as described herein, for example. One possible communication between a client 1002 and servers 1004 can be in the form of a data packet adapted to be transmitted between two or more computer processes. The sample computing environment 1000 includes a communication framework 1006 that can be employed to facilitate communications between the client(s) 1002 and the server(s) 1004. The client(s) 1002 are operably connected to one or more client data store(s) 1008 that can be employed to store information local to the client(s) 1002. Similarly, the server(s) 1004 are operably connected to one or more server data store(s) 1010 that can be employed to store information local to the servers 1004.

Reference throughout this specification to "one embodiment," or "an embodiment," means that a particular feature, structure, or characteristic described in connection with the embodiment is included in at least one embodiment. Thus, the appearances of the phrase "in one embodiment," "in one aspect," or "in an embodiment," in various places throughout this specification are not necessarily all referring to the same embodiment. Furthermore, the particular features, structures, or characteristics can be combined in any suitable manner in one or more embodiments.

As used in this disclosure, in some embodiments, the terms "component," "system," "interface," "manager," and the like are intended to refer to, or comprise, a computer-related entity or an entity related to an operational apparatus with one or more specific functionalities, wherein the entity can be either hardware, a combination of hardware and software, software, or software in execution, and/or firmware. As an example, a component can be, but is not limited to being, a process running on a processor, a processor, an object, an executable, a thread of execution, computer-executable instructions, a program, and/or a computer. By way of illustration and not limitation, both an application running on a server and the server can be a component One or more components can reside within a process and/or thread of execution and a component can be localized on one computer and/or distributed between two or more computers. In addition, these components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software application or firmware application executed by one or more processors, wherein the processor can be internal or external to the apparatus and can execute at least a part of the software or firmware application. Yet another example, a component can be an apparatus that provides specific functionality through electronic components without mechanical parts, the electronic components can comprise a processor therein to execute software or firmware that confer(s) at least in part the functionality of the electronic components. In an aspect, a component can emulate an electronic component via a virtual machine, e.g., within a cloud computing system. While various components have been illustrated as separate components, it will be appreciated that multiple components can be implemented as a single component, or a single component can be implemented as multiple components, without departing from example embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or." That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Inference can also refer to techniques employed for composing higher-level events from a set of events and/or data. Such inference results in the construction of new events or actions from a set of observed events and/or stored event data, whether the events are correlated in close temporal proximity, and whether the events and data come from one or several event and data sources. Various classification schemes and/or systems (e.g., support vector machines, neural networks, expert systems, Bayesian belief networks, fuzzy logic, and data fusion engines) can be employed in connection with performing automatic and/or inferred action in connection with the disclosed subject matter.

In addition, the various embodiments can be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, machine-readable device, computer-readable carrier, computer-readable media, machine-readable media, computer-readable (or machine-readable) storage/communication media. For example, computer-readable storage media can comprise, but are not limited to, radon access memory (RAM), read only memory (ROM), electrically erasable programmable read only memory (EEPROM), flash memory or other memory technology, solid state drive (SSD) or other solid-state storage technology, a magnetic storage device, e.g., hard disk; floppy disk; magnetic strip(s); an optical disk (e.g., compact disk (CD), a digital video disc (DVD), a Blu-ray Disc™ (BD)); a smart card; a flash memory device (e.g., card, stick, key drive); and/or a virtual device that emulates a storage device and/or any of the above computer-readable media. Of course, those skilled in the art will recognize many modifications can be made to this configuration without departing from the scope or spirit of the various embodiments.

Disclosed embodiments and/or aspects should neither be presumed to be exclusive of other disclosed embodiments and/or aspects, nor should a device and/or structure be presumed to be exclusive to its depicted element in an example embodiment or embodiments of this disclosure, unless where clear from context to the contrary. The scope of the disclosure is generally intended to encompass modifications of depicted embodiments with additions from other depicted embodiments, where suitable, interoperability among or between depicted embodiments, where suitable, as well as addition of a component(s) from one embodiment(s) within another or subtraction of a component(s) from any depicted embodiment, where suitable, aggregation of elements (or embodiments) into a single device achieving aggregate functionality, where suitable, or distribution of functionality of a single device into multiple device, where suitable. In addition, incorporation, combination or modification of devices or elements (e.g., components) depicted herein or modified as stated above with devices, structures, or subsets thereof not explicitly depicted herein but known in the art or made evident to one with ordinary skill in the art through the context disclosed herein are also considered within the scope of the present disclosure.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the subject matter has been described herein in connection with various embodiments and corresponding FIGs., where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A system, comprising:
a processor; and
a memory that stores executable instructions that, when executed by the processor, facilitate performance of operations, comprising:
selectively caching data related to an antivirus scan status of an object, resulting in cached data, wherein antivirus scanning of the object is a precondition for opening the object, and wherein the antivirus scan status of the object is one of an unscanned status, a queued status, or a scanned status; and
based on an open object request received from a node device of a cluster of node devices, and based on the cached data indicating the antivirus scan status of the object is the queued status or the scanned status, selectively facilitating the opening of the object at the node device while circumventing the precondition,
wherein the unscanned status indicates that a scan of a current state of the object has not been performed prior to receipt of the open object request,
wherein the queued status indicates that the scan of the object is in process and has not completed prior to the receipt of the open object request; and
wherein the scanned status indicates that a successful scan of the object has completed prior to the receipt of the open object request.

2. The system of claim 1, wherein the operations further comprise:
based on the antivirus scan status being the scanned status and prior to the selectively facilitating the opening of the object at the node device, returning a result of a previous scan of the object performed prior to the determining of the antivirus scan status.

3. The system of claim 1, wherein the operations further comprise:
based on the antivirus scan status being the queued status, waiting for completion of the scan of the object; and
returning a result of the scan of the object after the completion of the scan,
wherein the selectively facilitating the opening of the object at the node device comprises selectively facilitating the opening of the object at the node device based on the result.

4. The system of claim 1, wherein the node device is a first node device, wherein the scanned status is based on a previous scan of the object performed in response to a previous request for the object by the first node device or by a second node device of the cluster of node devices, wherein the previous scan was performed prior to the determining the antivirus scan status, and wherein the previous request was received prior to the open object request being received.

5. The system of claim 1, wherein the open object request is a first open object request, wherein the node device is a first node device, wherein the queued status is based on a second open object request received from a second node device of the cluster of node devices, and wherein the scan of the object, based on the second open object request from the second node device, is not completed prior to the receiving the first open object request from the first node device.

6. The system of claim 1, wherein the operations further comprise:
based on the antivirus scan status being the unscanned status, performing the antivirus scanning of the object in response to the open object request,
wherein the selectively facilitating the opening of the object at the node device comprises selectively facilitating the opening of the object at the node device based on the performing the antivirus scanning.

7. The system of claim 6, wherein the performing the antivirus scanning of the object further comprises storing a result of the antivirus scanning in a data store that is accessible for subsequent antivirus scan status determinations, after the antivirus scanning, for the object or for other objects, other than the object, available for the node devices of the cluster of node devices.

8. The system of claim 1, wherein the determining the antivirus scan status comprises receiving a lock value block data and an antivirus domain lock in response to the open object request.

9. The system of claim 8, wherein a value of the lock value block data is a defined fixed data size.

10. The system of claim 1, wherein the object is a file stored on a distributed file system.

11. The system of claim 1, wherein the cluster of node devices are nodes of a distributed file system.

12. A method, comprising:
selectively caching, by a system comprising a processor, data related to an antivirus scan status of an object, resulting in a cached antivirus scan status, wherein object antivirus scanning is a prerequisite to an opening of the object, and wherein the antivirus scan status of the object is determined to be one from a group of statuses comprising an unscanned status, a queued status, and a scanned status; and
based on a request to open the object received, as an open object request, from a node of a group of nodes and based on the cached antivirus scan status of the object being the queued status or the scanned status, selectively causing the opening of the object at the node while bypassing the prerequisite, wherein a scan of the object is not performed in response to the request to open the object,
wherein the unscanned status indicates that a previous antivirus scan to determine a virus status of the object was not performed prior to receipt of the request, wherein the queued status indicates an active antivirus scan is in process and has not completed prior to receipt of the request to open the object, and wherein the scanned status indicates that a successful antivirus scan of the object has completed prior to the receipt of the open object request.

13. The method of claim 12, wherein the node is a first node, and wherein the scanned status is based on the previous antivirus scan of the object, previous to the determining the antivirus scan status, performed in response to a previous request for the object, previous to the request, by the first node, or by a second node of the group of nodes.

14. The method of claim 12, wherein the node is a first node, wherein the queued status is based on a recent request, according to a defined recency criterion, to open the object received from a second node of the group of nodes, and wherein the scan of the object is not completed prior to the receiving the request to open the object from the first node of the group of nodes.

15. The method of claim 12, further comprising:
based on the antivirus scan status being the queued status, waiting for completion of the scan of the object;
returning a result of the scan of the object after the completion of the scan,
wherein the selectively causing the opening of the object at the node comprises selectively causing the opening of the object at the node based on the result.

16. The method of claim 12, wherein the object is a file stored on a distributed file system.

17. The method of claim 12, wherein the group of nodes comprises nodes of a distributed file system.

18. A non-transitory machine-readable medium, comprising executable instructions that, when executed by a processor, facilitate performance of operations, comprising:
selectively storing data indicative of an antivirus scan state of an object, resulting in a stored antivirus scan state, wherein antivirus scanning of the object is a precondition for opening the object, wherein the antivirus scan state of the object is a scanned state, an unscanned state, or a queued state, wherein the antivirus scan state is a state determined prior to receipt of a request to open the object, and wherein node equipment is enabled for scanning of objects, including the object, before opening the objects;
based on an open object request being received from node equipment of a group of node equipment and based on the antivirus scan state of the object determined to be the scanned state or the queued state, facilitating an opening of the object at the node equipment without an antivirus scan being performed in response to the request; and
based on the open object request being received from the node equipment of the group of node equipment and the antivirus scan state of the object determined to be the unscanned state, performing an antivirus scanning of the object.

19. The non-transitory machine-readable medium of claim 18, wherein the node equipment is a first node equipment, wherein the request is a first request, wherein the queued state is based on a second request from a second node equipment received before the first request, and wherein the antivirus scan of the object based on the second request is not completed prior to receipt of the first request.

20. The non-transitory machine-readable medium of claim 18, wherein the node equipment is first node equipment, and wherein the scanned state is based on a previous scan, prior to the request, of the object performed in response to a previous request for the object, prior to the request, by the first node equipment or by second node equipment of the group of node equipment.

* * * * *